United States Patent
Kimura (10) Patent No.: US 8,427,588 B2
(45) Date of Patent: Apr. 23, 2013

(54) TELEVISION RECEIVER

(75) Inventor: Katsunobu Kimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 591 days.

(21) Appl. No.: 12/428,698

(22) Filed: Apr. 23, 2009

(65) Prior Publication Data

US 2010/0060801 A1 Mar. 11, 2010

(30) Foreign Application Priority Data

Sep. 5, 2008 (JP) ................................. 2008-227861

(51) Int. Cl.
*H04N 5/50* (2006.01)

(52) U.S. Cl.
USPC ...... 348/732; 348/725; 348/734; 348/E5.097; 348/729; 348/731; 725/58; 725/139; 725/133; 725/141; 725/85; 725/135; 725/68; 725/153; 386/270; 386/E5.035

(58) Field of Classification Search .................. 348/732, 348/725, 691.6, 734, E5.097; 725/58, 133, 725/141, 153, 85, 135, 68; 386/94, 47, E5.035
See application file for complete search history.

(56) References Cited

U.S. PATENT DOCUMENTS

| 2006/0209892 | A1* | 9/2006 | MacMullan et al. | 370/468 |
| 2006/0280439 | A1* | 12/2006 | Ukai et al. | 386/94 |
| 2006/0294550 | A1* | 12/2006 | Matsuo | 725/68 |
| 2007/0186270 | A1* | 8/2007 | Kang et al. | 725/135 |
| 2008/0056200 | A1* | 3/2008 | Johnson | 370/333 |

FOREIGN PATENT DOCUMENTS

| GB | 2374483 A | 10/2002 |
| JP | 2007-053726 | 3/2007 |
| JP | 2007-067837 A | 3/2007 |
| JP | 2007053726 A * | 3/2007 |
| JP | 2007-325041 | 12/2007 |

OTHER PUBLICATIONS

International Search Report for European Patent Office application EP09251143.5 (Aug. 10, 2011).
Japan Patent Office office action for application JP2008-227861 (Sep. 4, 2012).

* cited by examiner

*Primary Examiner* — Jefferey Harold
*Assistant Examiner* — Omer Khalid
(74) *Attorney, Agent, or Firm* — Kilpatrick Townsend & Stockton LLP (57) ABSTRACT

A TV receiver transmits video data from its tuner unit to its monitor unit via wireless transmission by using a channel shared with radar. When the tuner unit receives a program to be viewed, a recorder/player starts recording of the received program. When wireless transmission of the received program cannot be started on time at the program start time because of detecting an unused channel for wireless transmission, or when a radar wave in the shared channel is detected after starting wireless transmission and then wireless data transmission is interrupted, the recorder/player plays back on a time-shift basis the program recorded on the recording medium, and the program data played back is transmitted to the monitor unit. The TV receiver is capable of preventing the user from missing a program that he wants to view even when wireless data transmission is interrupted.

10 Claims, 8 Drawing Sheets

FIG.4A
2.4GHz-BAND

FIG.4B
5GHz-BAND
REGULAR WAVE

FIG.4C
5GHz-BAND SHARED
WITH RADAR

TELEVISION RECEIVER

CLAIM OF PRIORITY

The present application claims priority from Japanese patent application serial No. JP 2008-227861, filed on Sep. 5, 2008, the content of which is hereby incorporated by reference into this application.

BACKGROUND OF THE INVENTION

1. Field of the Invention

The present invention relates to a television receiver (TV receiver) in which a tuner unit and a monitor unit are separated from each other, the tuner unit transmitting program data to the monitor unit via wireless transmission.

2. Description of the Related Art

In recent years, high-speed wireless LAN systems conforming to the IEEE802.11n standard, one of wireless networks standard, are coming to be used for information transmission between consumer digital information devices. For example, applying such a wireless LAN to a TV receiver in which a tuner unit and a monitor unit are separated from each other, the tuner unit transmitting program data to the monitor unit, eliminates the need of wiring between devices. Further, this configuration attains high-speed large-capacity transmission with a transmission rate of 100M bps or higher, making it easier to transmit large-capacity video data such as Hi-Vision high-definition pictures and the like.

The IEEE802.11n standard prescribes 5 GHz-band communication channels shared with commercial radar systems such as weather radars so as to increase the number of usable channels. However, devices utilizing the shared channels are regulated by the Wireless Telegraph Law so as to give priority to commercial radar systems and so as not to interfere their operations. Such devices are obliged to perform the following operations which are collectively referred to as Dynamic Frequency Selection (hereinafter abbreviated to DFS) operations.

(1) Channel Availability Check (hereinafter abbreviated to CAC): Before network establishment, the device scans radar waves for a minute and then sets an unused channel.

(2) In-Service Monitoring (hereinafter abbreviated to ISM) and Channel Move Time (hereinafter abbreviated to CMT): During regular operation, the device constantly monitors the radar wave of the unused channel. When it detects a radar wave, it stops data transmission through the channel within 10 seconds.

(3) Non-Occupancy Period: For the channel with radar wave detection, the device is not allowed to perform data transmission for 30 minutes since radar wave detection.

The following technique has been proposed in relation to the above-mentioned operations.

JP-A-2007-53726 discloses a technique for preselecting a communication channel with which interference to radar equipment does not occur so that communication channel changeover is not required during real-time video data transmission. Specifically, this technique performs the steps of: determining the possibility of radar wave existence based on information about a position at which wireless communication equipment is installed and on radar information used for identifying radar equipment, including a position at which the radar equipment is installed; and selecting a communication channel of the wireless communication equipment based on the result of the determination.

JP-A-2007-325041 discloses a technique for a wireless LAN channel on which a specific priority radio wave (radar wave) and a frequency band are overlapped. The technique investigates receive conditions of the specific priority radio wave. Specifically, a detection program according to the technique performs the steps of: receiving radio waves by sequentially selecting each wireless LAN channel on which the specific priority radio wave and the frequency band are overlapped, and identifying the specific priority radio wave from the received radio waves based on a predetermined identification criterion; and setting any one channel on which no specific priority radio wave is detected as a channel to be used for the wireless LAN.

SUMMARY OF THE INVENTION

The IEEE802.11n standard prescribes 2.4 GHz and 5 GHz bands as usable transmission bands. The 5 GHz band includes channels shared with radar and channels not shared therewith (hereinafter the latter channels are referred to as regular-wave channels). When video data is transmitted with a TV receiver, it is desirable to perform wireless transmission by using the 5 GHz-band channels enabling high-definition transmission, in particular, the 5 GHz-band regular-wave channels having no possibility of interference with radar waves. However, in some cases, a 5 GHz-band channel shared with radar must be used since no unused channel is found from among the 5 GHz-band regular-wave channels.

When a 5 GHz-band channel shared with radar is used, it is necessary to perform the above-mentioned CAC operation to detect an unused channel from among the 5 GHz-band channels shared with radar. In this case, however, it takes considerable time (for several minutes) to complete the CAC operation, determine an unused channel, and become ready for wireless transmission of received images. During this period, wireless transmission is interrupted and therefore the user cannot view the start portion of a desired program.

Further, even after starting communication by using a 5 GHz-band channel shared with radar, it is necessary to monitor radar waves of the active channel (ISM) and, when a radar wave is detected, stop wireless transmission via the channel (CMT). This causes a problem that the user cannot view the intermediate portion of the program.

The technique of JP-A-2007-53726 predicts, prior to selection, a communication channel without interference based on the information of installation position of radar equipment, etc. This means that the positions of both the radar equipment and the wireless communication equipment are fixed. Therefore, when the position of either equipment changes, interference may occur during communication making it necessary to interrupt real-time transmission. Further, each piece of wireless communication equipment must obtain the installation position information of radar equipment existing in surrounding areas for channel selection, and frequently update it to the latest information, so that the technique is not practical.

The technique of JP-A-2007-325041 relates to a method for selecting a channel on which no specific priority radio wave (radar wave) is detected, and setting the channel as an operating channel. This technique does not mention the problem that if wireless data transmission is interrupted then viewing of program is interrupted.

An object of the present invention is to provide a TV receiver which transmits video data to its monitor unit via wireless transmission by using a channel shared with radar, the TV receiver being capable of preventing the user from missing a program that he wants even when wireless data transmission is interrupted.

The TV receiver according to the present invention comprises a tuner unit comprising: a recorder/player which records a received program to a recording medium and plays it back therefrom; a wireless transmitter which transmits data of the received program or the program played back by the recorder/player to the monitor unit via wireless transmission, the wireless transmitter being capable of sharing a channel with commercial radar for wireless transmission; and a wireless receiver which searches for an unused channel for wireless transmission and detects the arrival of a commercial radar wave. When the tuner unit receives a program to be viewed, the recorder/player starts recording of the received program to the recording medium.

With the TV receiver according to the present invention, when wireless transmission of the received program cannot be started on time at the program start time because of the processing by the wireless receiver of the tuner unit to detect an unused channel from among the channels shared with commercial radar, the recorder/player plays back on a time-shift basis the program recorded on the recording medium, and the wireless transmitter transmits the program data played back to the monitor unit via wireless transmission.

With the TV receiver according to the present invention, when the wireless receiver, after the wireless transmitter of the tuner unit starts wireless transmission by using a channel shared with commercial radar, detects the arrival of a commercial radar wave in the channel and then the wireless transmitter interrupts wireless data transmission so as to stop wireless transmission and then select another usable channel, the recorder/player plays back on a time-shift basis the program recorded on the recording medium, and the wireless transmitter transmits the program data played back to the monitor unit via wireless transmission.

The TV receiver according to the present invention includes a tuner unit and a monitor unit, the tuner unit transmitting program data to the monitor unit via wireless transmission. Even when the start of wireless data transmission is delayed or data transmission is interrupted, the TV receiver can prevent the user from missing the program that the user wants to view, thereby improving the user-friendliness.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

An embodiment of the present invention will be explained below with reference to the accompanying drawings.

Figure 1:
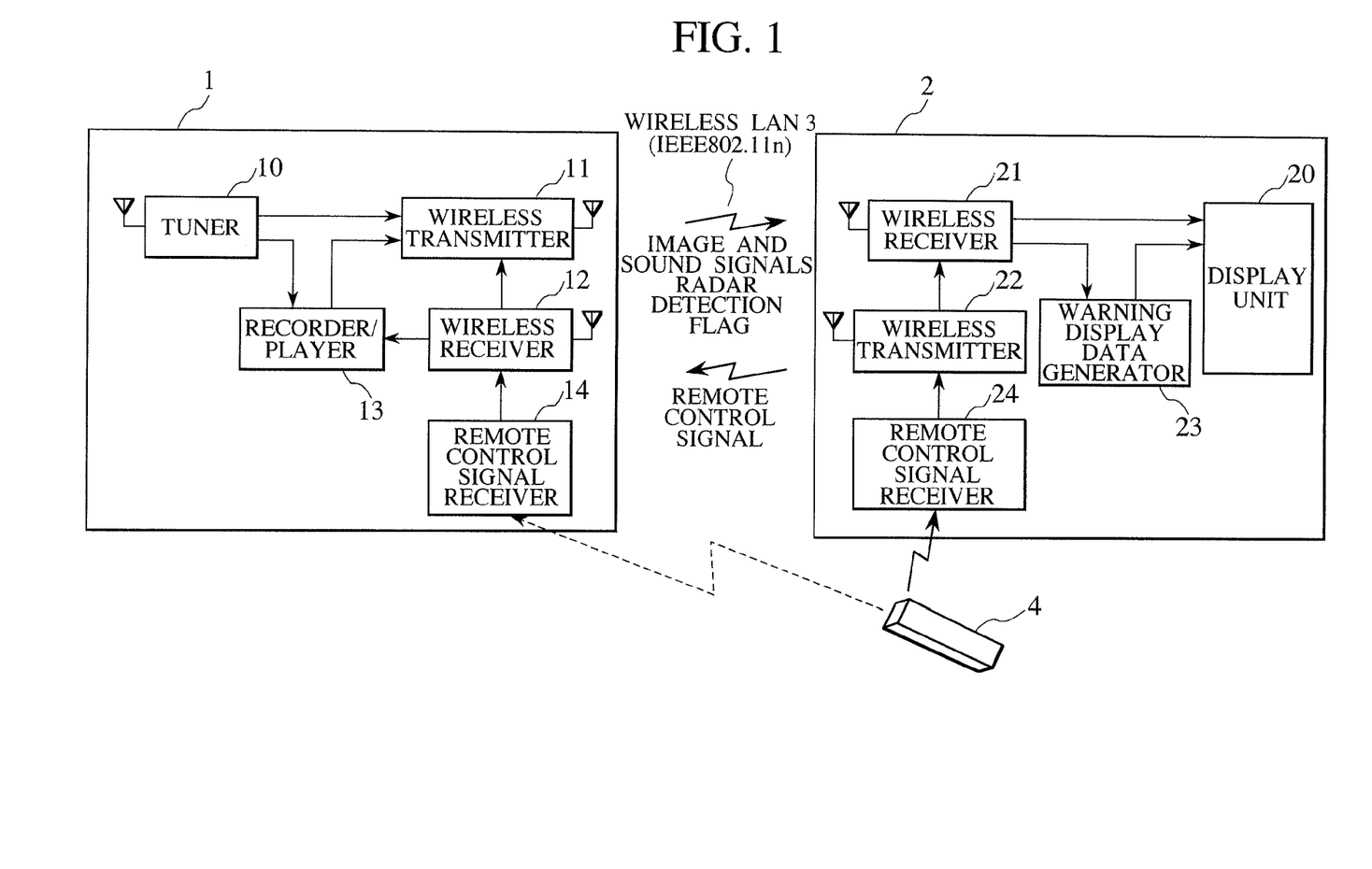
FIG. 1 shows the general configuration of a TV receiver according to an embodiment of the present invention.

FIG. 1 shows the schematic configuration of a TV receiver according to an embodiment of the present invention. The TV receiver according to the present embodiment includes a tuner unit 1 which receives a broadcast program and a monitor unit 2 which plays back images and sounds of the program. The tuner unit 1 and the monitor unit 2 are separated from each other. The tuner unit 1 transmits video and audio data to the monitor unit 2 via wireless transmission through a wireless LAN 3. While an operation signal from a remote control 4 is usually received by the monitor unit 2, it is received by the tuner unit 1 when wireless communication by the wireless LAN 3 is interrupted. Further, when communication by the wireless LAN 3 is difficult, it is also possible to connect the tuner unit 1 and the monitor unit 2 with a cable such as HDMI (High Definition Multimedia Interface; not shown) to transmit video and audio data.

The tuner unit 1 includes a tuner 10 which receives broadcast waves and tunes a program; a recorder/player 13 which once records the received video and audio signals on a recording medium; a wireless transmitter 11 which transmits the video and audio signals from the tuner 10 or the recorder/player 13 to the monitor unit 2; a wireless receiver 12 which detects an unused channel for wireless communication and then receives a remote control signal from the monitor unit 2; and a remote control signal receiver 14 which receives an operation signal from the remote control 4 while wireless communication is interrupted.

The monitor unit 2 includes a wireless receiver 21 which receives the video and audio signals transmitted from the tuner unit 1; a wireless transmitter 22 which transmits the remote control signal to the tuner unit 1; a warning display data generator 23 which generates messages to be displayed when wireless communication is interrupted; a display unit 20 which outputs images and sounds and displays messages; and a remote control signal receiver 24 which receives an operation signal from the remote control 4.

Conforming to IEEE802.11n standard, the wireless LAN 3 utilizes either the 5 GHz band (including regular-wave channels and channels shared with radar) or the 2.4 GHz band to transmit video and audio signals, a radar detection signal, and remote control signal. When it becomes necessary to use a 5 GHz-band channel shared with radar, the wireless receiver 12 detects an unused channel by performing the above-mentioned DFS operations. During wireless communication, the tuner unit 1 constantly monitors radar waves on the 5 GHz-band channels shared with radar and, when a radar wave is detected, stops transmission through the channel, and selects another unused channel.

With the TV equipment according to the present embodiment, the tuner unit 1 includes the recorder/player 13. While the tuner 10 is receiving a program, the recorder/player 13 automatically records the received program (video and audio signals) on a recording medium. When wireless data transmission is interrupted and then restarted, the recorder/player 13 plays back on a time-shift basis from the recording medium the program signal that should have been transmitted during the interruption period, transmits the signal to the monitor unit 2 via wireless transmission, and displays it on the display unit 20 for viewing. Further, in the present embodiment, the monitor unit 2 includes the warning display data generator 23. When wireless data transmission is interrupted, the warning display data generator 23 generates a warning message for informing the user that program viewing will be interrupted, and then displays it on the display unit 20. In this case, while wireless transmission is interrupted, the display unit 20 can also display a still picture displayed immediately before program viewing is interrupted.

This configuration makes it possible to prevent the user from missing a program that he wants even when wireless data transmission is interrupted for channel changeover, etc., even when a 5 GHz-band channel shared with radar is used. Further, displaying a message regarding the interruption of wireless communication improves the user friendliness.

Figure 2:
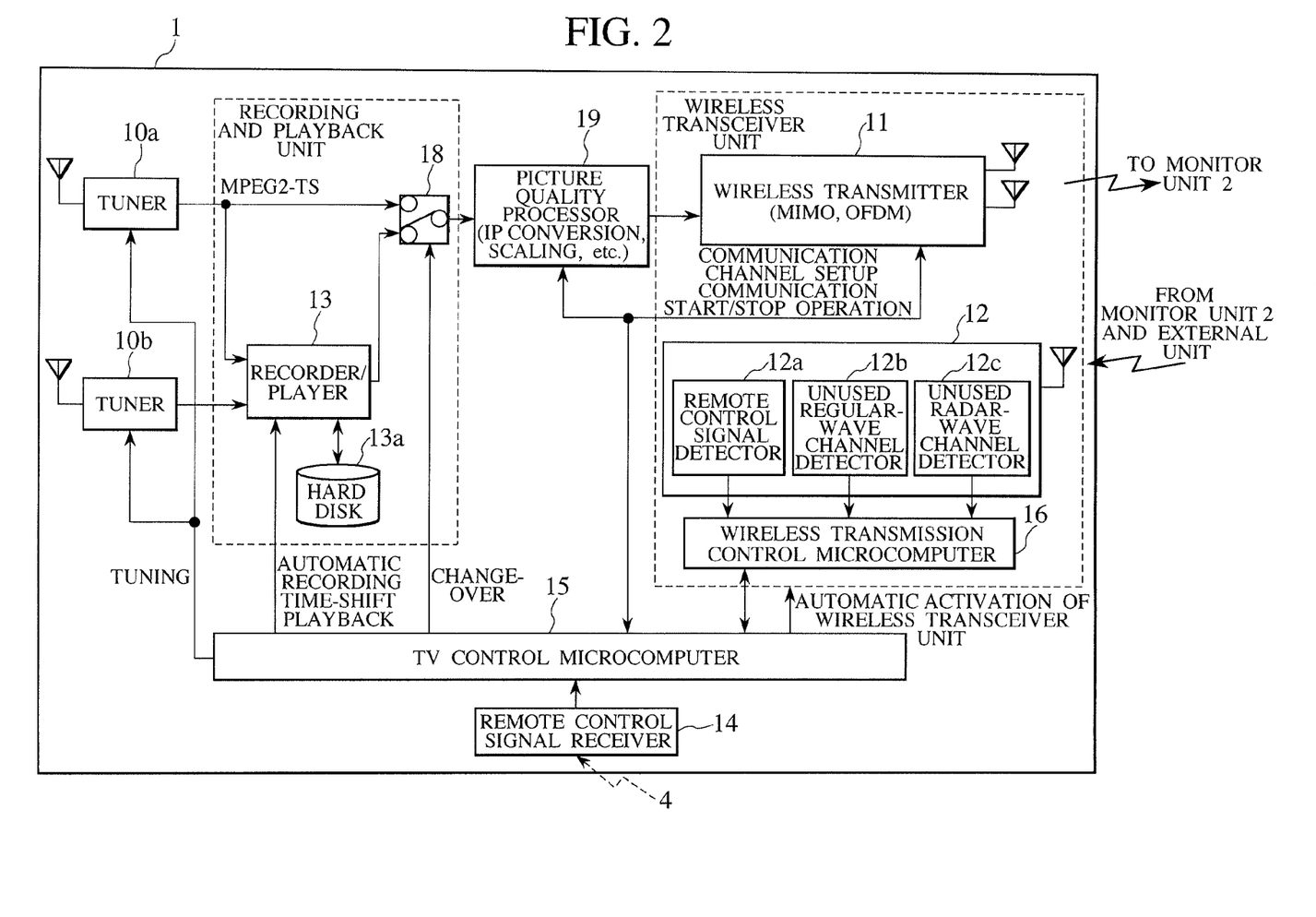
FIG. 2 shows the detailed configuration of a tuner unit 1 of FIG. 1.

FIG. 2 shows the detailed configuration of the tuner unit 1 of FIG. 1.

A pair of tuners 10a and 10b receives ground waves, and BS, CS and other digital broadcast waves, tunes a program requested by the user, and outputs image and sound streams (MPEG2-TS) of the program. The tuner 10b is used to receive and record a counterprogram. The recorder/player 13 records the image and sound streams on the recording medium such as a hard disk 13a, and plays back the recorded image and sound streams on a time-shift basis according to commands.

Time-shift playback refers to a function for recording broadcast video and audio data on the recording medium and then playing the recorded data back with a desired time lag. This function makes it possible to display a broadcast program as if it were received on a time-shift basis. Time-shift playback can also be performed in combination with the pause and fast-forward functions.

A selector switch 18 selects either the image and sound streams received by the tuner 10a or the image and sound streams played back from the recorder/player 11. A picture quality processor 19 performs IP (interlace/progressive) conversion and scaling processing (resolution conversion) based on the transmission mode. With the MPEG2 format, for example, data transmission with the HD (high-definition) picture quality (about 24 Mbps) is not possible. In this case, it is necessary to perform scaling conversion from the HD picture quality to the SD (standard definition) picture quality so as to reduce the data transmission quantity.

The wireless transmitter 11 transmits the image and sound streams processed by the picture quality processor 19 to the monitor unit 2 via wireless transmission through the wireless LAN 3. In this case, either the 5 GHz-band channels (including regular-wave channels and channels shared with radar) or the 2.4-GHz band channels is used based on the transmission format of the IEEE802.11n standard. The wireless transmitter 11 employs the multiple-input multiple-output (hereinafter abbreviated to MIMO) transmission mode and the orthogonal frequency division multiplex (OFDM) modulation mode. With the MIMO mode, the transmit side superimposes different data at the same time at the same frequency and then transmits it from a plurality of transmit antennas, and the receive side receives the signal with a plurality of receive antennas and then separate the data through digital signal processing, thereby allowing high-speed transmission with less multipath distortion.

The wireless receiver 12 includes a remote control signal detector 12a, an unused regular-wave channel detector 12b, and an unused radar-wave channel detector 12c. The remote control signal detector 12a detects the remote control signal transmitted from the monitor unit 2 through the wireless LAN 3. The unused regular-wave channel detector 12b detects an unused channel not used by other devices from among the 2.4 GHz-band channels or 5 GHz-band regular-wave channels (not shared with radar). The unused radar-wave channel detector 12c detects an unused channel devoid of a radar wave from among the 5 GHz-band channels shared with radar according to the above-mentioned DSF operation. When a 5 GHz-band channel shared with radar is used, the unused radar-wave channel detector 12c constantly monitors the arrival of a radar wave in the channel and, when it detects a radar wave, outputs the "radar detection signal."

A wireless transmission control microcomputer 16 outputs a control signal to the wireless transmitter 11 based on the result of detection by the wireless receiver 12. Specifically, the wireless transmission control microcomputer 16 determines a communication channel used for transmission based on the result of the unused channel detection, and selects another channel as required. When the unused radar-wave channel detector 12c detects a radar wave, it issues a "radar detection flag" to direct stop of transmission. The "radar detection flag" is transmitted from the wireless transmitter 11 to the monitor unit 2 through the wireless LAN 3.

The TV control microcomputer 15 controls the entire tuner unit 1 and controls program tuning by the tuners 10a and 10b according to the remote control signal. In this case, the TV control microcomputer 15 receives a program reservation from the user, and automatically activates the wireless transceiver unit at a predetermined time period before the reserved program starts. Further, the TV control microcomputer 15 controls the start of automatic recording by the recorder/player 13, start and stop of time-shift playback, and selection of a selector 18 in conjunction with the wireless transmission control signal from the wireless transmission control microcomputer 16. While wireless communication is interrupted, the remote control signal receiver 14 receives an operation signal from the remote control 4 and then transmits it to the TV control microcomputer 15. This makes it possible to turn OFF the main power of the tuner unit 1 also while wireless communication is interrupted.

Figure 3:
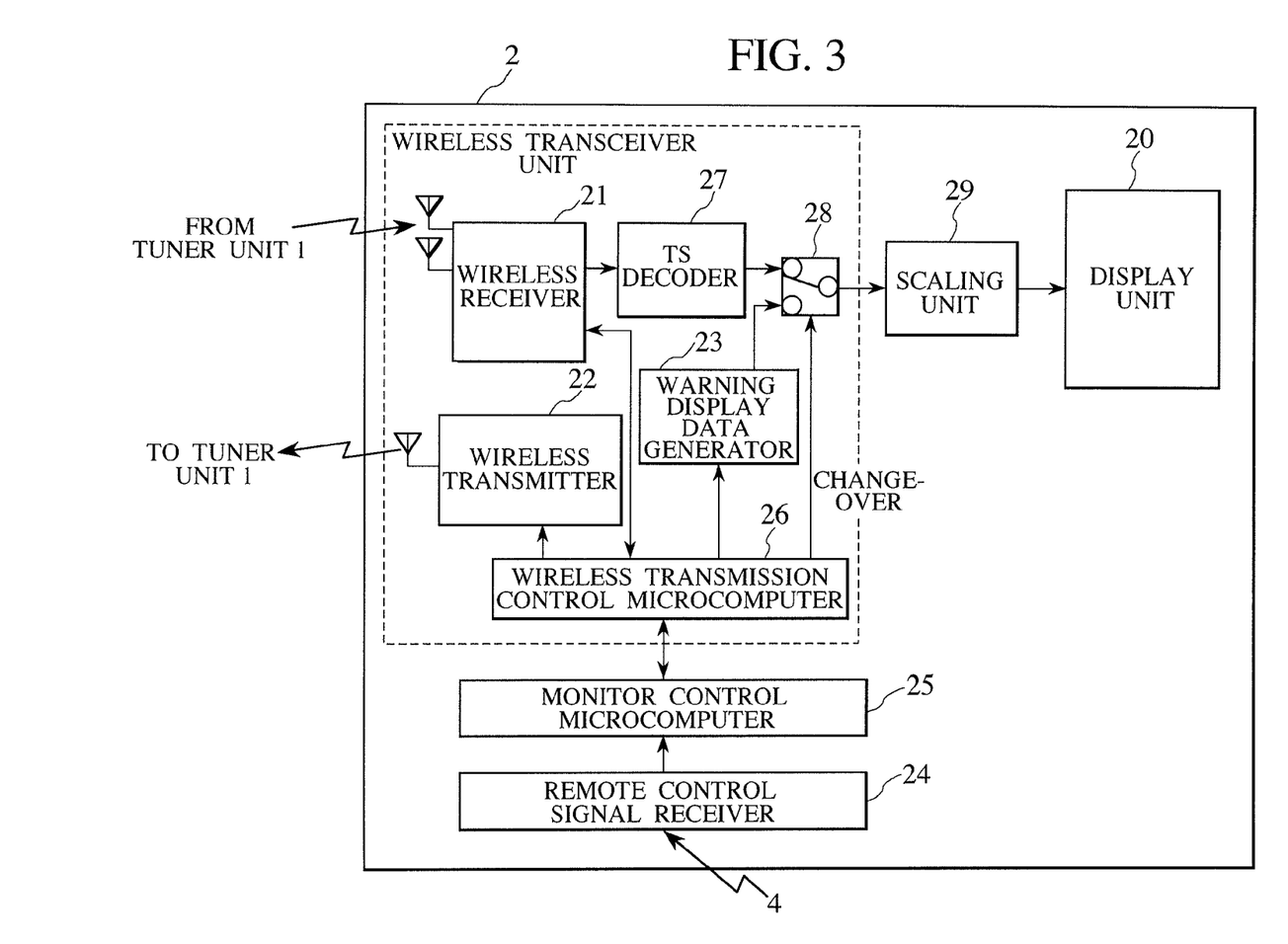
FIG. 3 shows the detailed configuration of a monitor unit 2 of FIG. 1.

FIG. 3 shows the detailed configuration of the monitor unit 2 of FIG. 1.

The wireless receiver 21 receives the image and sound streams and radar detection flag transmitted from the tuner unit 1 through the wireless LAN 3. A TS decoder 27 performs decode processing of the received image and sound streams (MPEG2-TS). Further, when the reception of image and sound streams is interrupted, the TS decoder 27 repetitively reads video data frames stored in its internal frame memory and then outputs it as still pictures.

Figure 8A:
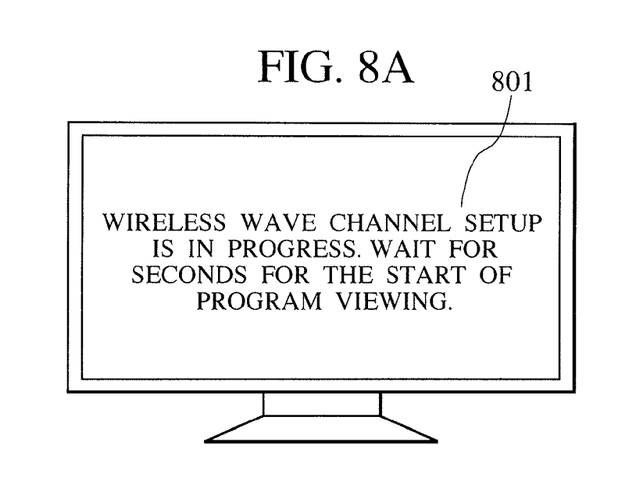
FIGS. 8A to 8C show example warning messages displayed on a display unit 20.
Figure 8B:
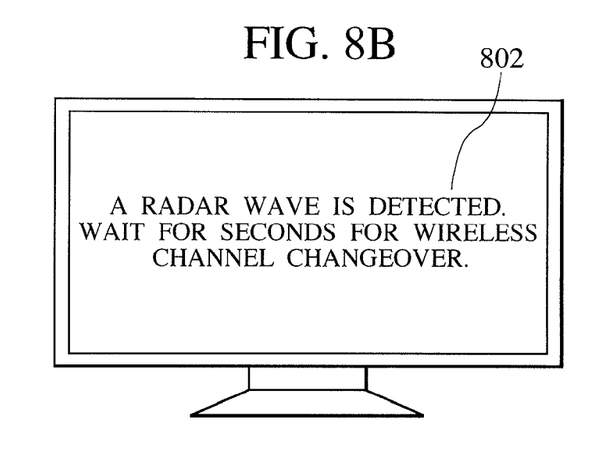

When the tuner unit 1 transmits the radar detection flag to the wireless receiver 21, wireless data transmission is interrupted disabling the reception of image and sound streams. In this case, the wireless transmission control microcomputer 26 instructs the warning display data generator 23 to create a warning message and then display it on the display unit 20. The warning message displayed is, for example, "Radar wave was detected. Since wireless channel will be changed, wait for second" as shown in FIG. 8B. This message notifies that program viewing will be interrupted.

The selector switch 28 selects the video and audio signals from the TS decoder 27 (including still pictures) or the message from the warning display data generator 23. A scaling unit 29 performs resolution conversion (from HD to SD and vice versa) in conformity with the display format on the display unit 20. The display unit 20 displays images and outputs sounds. The display unit 20 uses a PDP, LCD, organic EL, etc. as the display element.

A remote control signal receiver 24 receives an operation signal from the remote control 4, and the monitor control microcomputer 25 controls the entire monitor unit 2 according to this signal. The wireless transmission control microcomputer 26 generates a remote control signal and then instructs the wireless transmitter 22 to transmit it to the tuner unit 1 via wireless transmission.

Figures 4A, 4B:
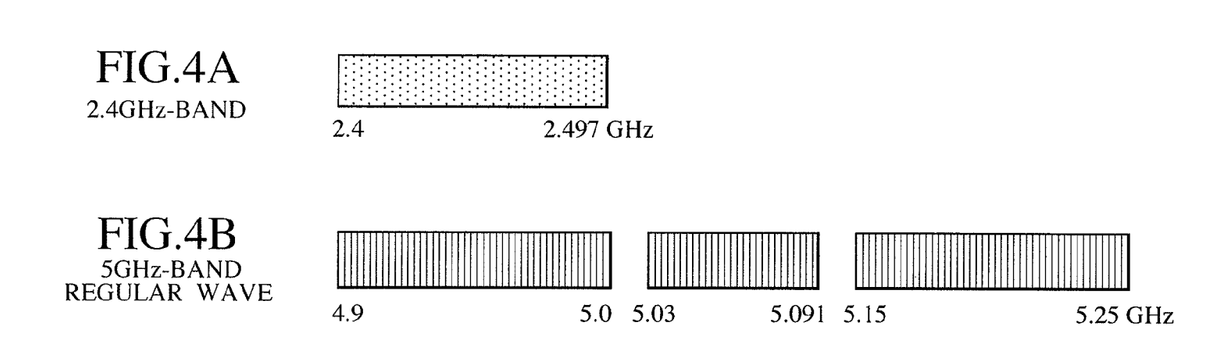
FIGS. 4A to 4C show frequency bands that can be used by a wireless LAN 3.
Figure 4C:
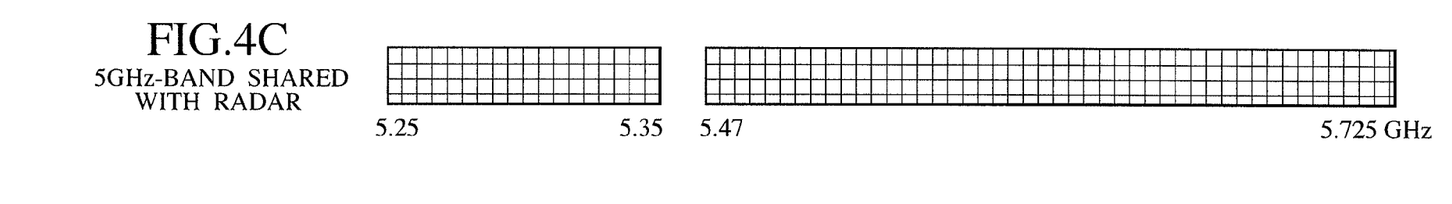

FIGS. 4A to 4C show frequency bands that can be used by the wireless LAN 3.

FIG. 4A shows the 2.4 GHz band used for medical equipment, microwave ovens, cordless phones, and the like. Since the 2.4 GHz band has a virtual data transmission rate of about 10 Mbps, data transmission with the HD picture quality (about 24 Mbps) is not possible, for example, with the MPEG2 format. In this case, it is necessary to perform scaling conversion to the SD picture quality so as to reduce the data transmission quantity.

FIG. 4B shows the 5 GHz-band waves not shared with radar. Since the 5 GHz band has a transmission rate of 100 Mbps or higher allowing transmission of a plurality of video data having the HD picture quality. Since the 5 GHz band is not shared with radar and therefore the TV receiver is not obliged to perform the DFS operations, this band is easier to use than any other bands. Hereinafter, this band is referred to as regular wave.

FIG. 4C shows the 5 GHz-band waves shared with radar. The 5 GHz-band waves have a wide bandwidth allowing selection of a number of channels. However, since these waves are shared with commercial radar systems such as weather radars operating on the same frequency, the TV receiver is obliged to perform the DFS operations so as to avoid interference to radar operations.

With the TV receiver according to the present embodiment, priority of bands used for wireless communication is gives to (b) 5 GHz-band regular waves, (c) 5 GHz-band waves shared with radar, and (a) 2.4 GHz band wave in this order, that is, (b) is given the highest priority and (a) the lowest. The wireless receiver 12 searches for an unused channel in this order. When the wireless receiver 12 can select one of (b) 5 GHz-band regular-wave channels, it maintains this channel. When the radar receiver 12 selects one of (c) 5 GHz-band channels shared with radar, it monitors radar waves of the selected channel and, when a radar wave is detected, stops wireless transmission and then selects another usable channel. Further, when the wireless receiver 12 selects one of (c) 5 GHz-band channels shared with radar or one of (a) 2.4 GHz-band channels, it searches for an unused channel in a band having higher priority while performing wireless transmission and, when a usable channel is detected, selects the detected channel.

It is also possible to determine the priority at user's discretion, and give higher priority to (c) 5 GHz-band waves shared with radar than (b) 5 GHz-band regular waves. Since (b) 5 GHz-band regular-wave channels are frequently used by other wireless LAN systems, it is expected that no unused channel is found in many cases. In such environment, (c) 5 GHz-band waves shared with radar are easier to use.

Figure 5A:
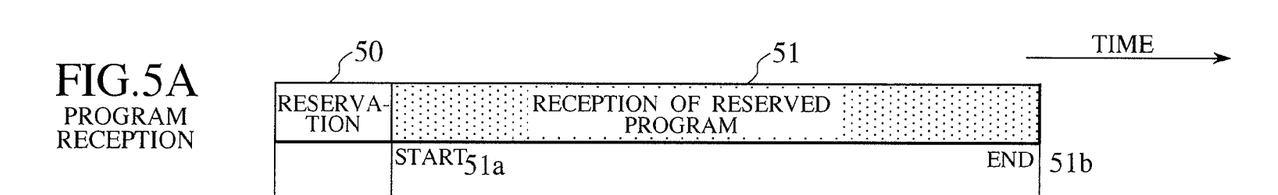
FIGS. 5A to 5D show the sequence of operations of the TV receiver according to the present embodiment.
Figures 5B, 5C, 5D:
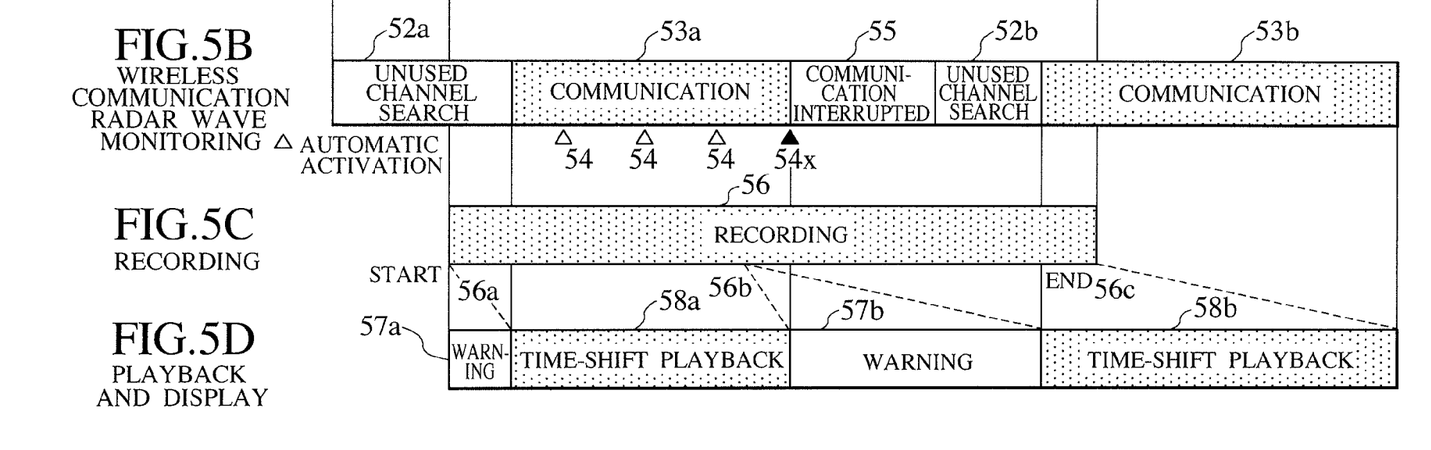

FIGS. 5A to 5D show the sequence of operations of the TV receiver according to the present embodiment. FIG. 5A shows program reception operation; FIG. 5B, wireless communication operation; FIG. 5C, recording operation; and FIG. 5D, playback and display operations.

The user reserves a program he wants to view (50). The tuner unit 1 starts reception (51) of the reserved program from the program start time (51a). The wireless transmitter 11 and wireless receiver 12 are automatically activated at a predetermined time (for example, 5 minutes) before the program start time (51a), and the wireless receiver 12 searches for an unused channel used for communication (52a). When the wireless receiver 12 detects an unused channel, the wireless transmitter 11 starts communication (53a) with the detected channel and then transmits program data (video and audio signals) to the monitor unit 2.

When the wireless receiver 12 searches for an unused 5 GHz-band channel shared with radar (52a), it takes time to perform operations according to the DFS standard to determine a usable channel. Therefore, in some cases, wireless transmission cannot be started on time at the reserved program start time (51a). The present embodiment automatically starts program recording (56) at the same time (56a) as the program reception start time (51a). Then, when communication (53a) becomes possible, the recorder/player 13 plays back the recorded program on a time-shift basis (58a) from the start point (56a) and then transmits it to the monitor unit 2 via wireless transmission. In this way, the user can view the program from its start portion. While wireless communication is disabled at the program start time, the display unit 20 displays a warning message (57a) notifying that wireless communication is disabled.

When the wireless receiver 12 is performing communication by using a 5 GHz-band channel shared with radar (53a), it constantly monitors whether or not a radar wave of the active channel has arrived according to DFS standard (54). When a radar wave is detected (54x), the wireless receiver 12 immediately interrupts communication by the channel (55) and the recorder/player 13 stops time-shift playback (58a). Then, the wireless receiver 12 searches for another usable channel (52b). While the wireless receiver 12 interrupts communication (55) and is searching for an unused channel (52b), the display unit 20 displays a warning message (57b) notifying that wireless communication is interrupted.

When an unused channel is found, the wireless receiver 12 selects the detected channel as a communication channel and then resumes communication (53b), and the recorder/player 13 restarts time-shift playback of the recorded program (58b) from the interrupted position (56b). In this way, even when communication is interrupted during program viewing, the recorder/player 13 automatically plays back the interrupted portion on a time-shift basis after communication recovers, allowing the user to view the program without missing the intermediate portion. The recorder/player 13 plays back on a time-shift basis the recorded program up to its end point (56c), allowing the user to view the entire portion of the reserved program.

Figure 6:
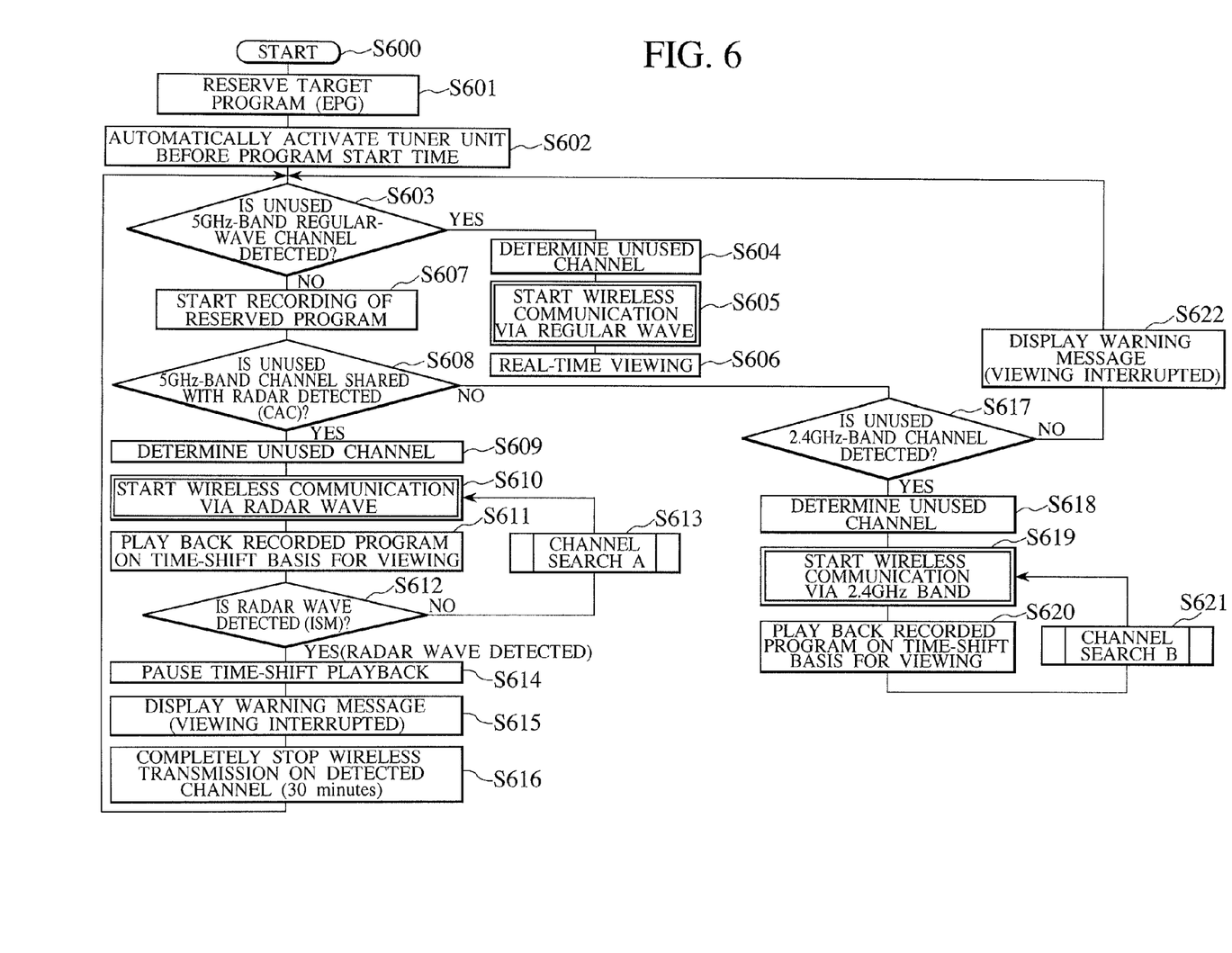
FIG. 6 is a flow chart showing the process of program viewing by the TV receiver according to the present embodiment.
Figure 8C:
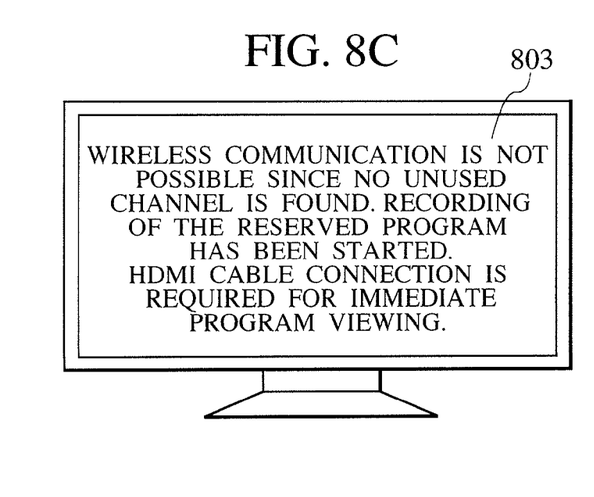

FIG. 6 is a flow chart showing the process of program viewing by the TV receiver according to the present embodiment. FIGS. 8A to 8C show example warning messages displayed on the display unit 20. The flow chart will be explained step by step blow.

S601: The user operates the remote control 4 to reserve a program that he wants to view with reference to the EPG (electronic program guide).

S602: Turns ON the power of the tuner unit 1, for example, at 5 minutes before the program start time, tunes the program for viewing, and prepares for wireless transmission.

S603: The wireless receiver 12 determines whether or not an unused channel is found from among the 5 GHz-band regular-wave channels.

S604: When an unused channel is found from among the 5 GHz-band regular-wave channels, the wireless receiver 12 determines the detected channel as a communication channel.

S605: The wireless transmitter 11 intermediately starts wireless communication via the determined regular-wave channel.

S606: The monitor unit 2 receives the program data transmitted via wireless transmission and then displays it on the display unit 20 in real time for viewing.

S607: When no unused channel is found from among the 5 GHz-band regular-wave channels in S603, the recorder/player 13 automatically starts recording of the program reserved in S601.

S608: The wireless receiver 12 searches for an unused channel from among the 5 GHz-band channels shared with radar. Specifically, the wireless receiver 12 scans each channel and, when no radar wave is detected within a minute, determines the channel as an unused channel according to the DFS standard (CAC operation).

S609: When an unused channel is found from among the 5 GHz-band channels shared with radar, the wireless receiver 12 determines the detected channel as a communication channel.

S610: The wireless transmitter 11 starts wireless communication by using the determined channel shared with radar.

S611: The recorder/player 13 plays back on a time-shift basis the recorded program from the recording medium. The wireless transmitter 11 transmits the played back program data via wireless transmission to the monitor unit 2, allowing the user to view the program on the display unit 20 of the monitor unit 2. Until the recorder/player 13 starts time-shift playback, the display unit 20 displays a warning message notifying that the start of viewing will be delayed because of communication channel setup. An example of this message is shown as a message 801 of FIG. 8A.

S612: In the case of a 5 GHz-band channel shared with radar, the wireless receiver 12 constantly monitors whether or not a radar wave has arrived in the channel while performing communication according to the DFS standard (ISM operation). When no radar wave is detected, the sequence proceeds to S613 and then returns to S610 to continue communication with the currently selected channel.

S613: Even when no radar wave is detected, the wireless receiver 12 searches for an unused 5 GHz-band regular-wave channel having high priority than the currently selected channel. When an unused channel is found, the wireless receiver 12 selects the detected channel as a communication channel (this process is referred to as "channel search A" and will be mentioned later in FIG. 7A).

S614: When a radar wave is detected, the use of the channel is inhibited according to the DFS standard and therefore the recorder/player 13 pauses time-shift playback.

S615: The wireless transmitter 11 transmits the "radar detection flag" showing that a radar wave is detected to the monitor unit 2, and the display unit 20 displays a warning message notifying that viewing will be interrupted because of channel changeover due to radar wave detection." An example of this message is shown as a message 802 of FIG. 8B. At the same time, the display unit 20 displays a still picture displayed immediately before the recorder/player 13 stops the playback operation.

S616: The wireless transmitter 11 completely stops wireless transmission through the channel according to the DFS standard. Subsequently, the use of the channel is inhibited for 30 minutes. In this case, the sequence returns to S603 to search for another usable channel. When a usable channel is found, the wireless receiver 12 selects the detected channel as a communication channel.

S617: When no unused channel is found from among the 5 GHz-band channels shared with radar in S608, the wireless receiver 12 searches for an unused 2.4 GHz-band channel.

S618: When an unused 2.4 GHz-band channel is found, the wireless receiver 12 determines the detected channel as a communication channel.

S619: The wireless transmitter 11 starts wireless communication with the determined 2.4 GHz-band channel.

S620: The recorder/player 13 plays back on a time-shift basis the recorded program from the recording medium. The wireless transmitter 11 transmits the played back program data via wireless transmission to the monitor unit 2, allowing the user to view the program on the display unit 20 of the monitor unit 2. However, since the 2.4 GHz band has a small data transmission capacity, the picture quality processor 19 converts the HD picture quality to the SD picture quality before transmission.

S621: Search for an unused 5 GHz-band channel having high priority than the currently selected channel. When an unused channel is found, the wireless receiver 12 selects the detected channel as a communication channel (this process is referred to as "channel search B" and will be mentioned later in FIG. 7B).

S622: When no unused 2.4 GHz-band channel is found in S617, the display unit 20 displays a warning message notifying that wireless communication is not possible because of no unused channel, recording of the reserved program has been started, and HDMI cable connection is necessary for immediate viewing. An example of this message is shown as a message 802 of FIG. 8C. Control returns to S603 to search for another usable channel. When a usable channel is found, the wireless receiver 12 selects the detected channel as a communication channel, and the wireless transmitter 11 starts communication via the detected channel.

The above-mentioned flow chart is an example and the following variants are possible.

S604 (automatic start of recording) can be executed before S603 (detection of an unused 5 GHz-band regular-wave channel) or simultaneously with S602 (automatic activation of the tuner unit).

S603 (search for an unused regular-wave channel) and S608 (search for an unused channel shared with radar) can be executed as a series of scanning operations. Further, it is also possible to give higher priority on S608 (radar wave) than S603 (regular wave) to select a band of an unused channel.

Although S615 and S622 display a respective warning message when program viewing is interrupted or disabled, the contents of these messages are not limited to the ones of FIG. 8. These messages can be displayed independently or in combination.

Figure 7A:
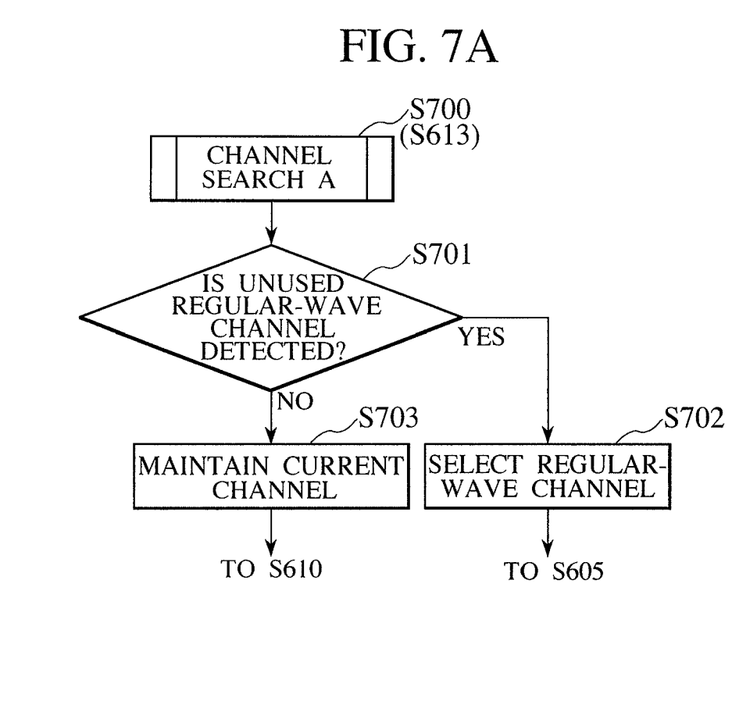
FIGS. 7A and 7B are flow charts showing details of steps S613 and S621 of FIG. 6.
Figure 7B:
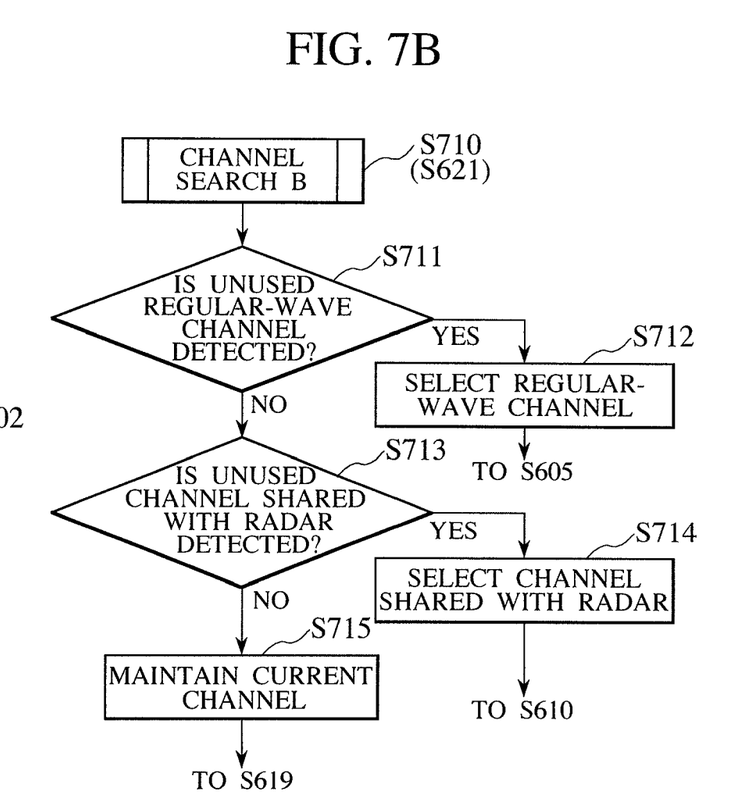

FIGS. 7A and 7B are flow charts showing the details of the channel search processes (S613 and S621) of FIG. 6.

In channel search A (S700 to S613) of FIG. 7A, the wireless receiver 12 starts communication with a 5 GHz-band channel shared with radar and then searches for a 5 GHz-band regular-wave channel having higher priority. S701 determines whether or not an unused channel is found from among the 5 GHz-band regular-wave channels. When an unused channel is found from among the 5 GHz-band regular-wave channels, S702 selects the detected unused regular-wave channel and then the sequence proceeds to S605 to continue wireless communication via the selected regular-wave channel. When no unused channel is found, S703 maintains the currently selected channel and then the sequence returns to S610 to continue wireless communication via the selected channel shared with radar.

In channel search B (S710 to S621) of FIG. 7B, the wireless transmitter 11 starts communication via the 2.4 GHz-band channel and then searches for a 5 GHz-band regular-wave channel or a 5 GHz-band channel shared with radar having higher priority. S711 determines whether or not an unused channel is found from among the 5 GHz-band regular-wave channels. When an unused channel is found from among the 5 GHz-band regular-wave channels, S712 selects the detected unused regular-wave channel and then the sequence proceeds to S605 to continue wireless communication via the selected regular-wave channel. When no unused channel is found, S713 determines whether or not an unused channel is found from among the 5 GHz-band channels shared with radar. When an unused channel is found from among the 5 GHz-band channels shared with radar, S714 selects the detected unused channel shared with radar and then the sequence proceeds to S610 to continue wireless communication via the selected channel shared with radar. When no unused channel is found, S715 maintains the currently selected channel and then the sequence returns to S619 to continue wireless communication via the 2.4 GHz-band channel.

In accordance with the present embodiment, the following effects can be exhibited.

(1) When wireless communication is started using a 5 GHz-band channel shared with radar, communication may not be started on time at the program start time because of the processing for detecting an unused channel from among the channels shared with radar. Even in this case, the user does not miss the start portion of the program since the recorder/player automatically starts recording of the reserved program and then plays it back on a time-shift basis.

(2) When a radar wave arrives during wireless communication using a 5 GHz-band channel shared with radar, communication is interrupted for channel changeover. Even in this case, the user does not miss the intermediate portion of the program since the recorder/player 13 plays back on a time-shift basis the program recorded on the recording medium.

(3) The bands used for wireless communication are given priorities, and the radar receiver searches for a usable channel in the bands in order of their priorities. Even when the wireless receiver selects a channel in a band having lower priority, it can search for a channel in a band having higher priority while performing communication for channel changeover.

(4) When wireless data transmission is interrupted disabling program viewing, the monitor unit displays a relevant warning message notifying that wireless transmission is interrupted, thereby improving the user-friendliness.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A television receiver comprising:
    a tuner unit which receives program data; and
    a monitor unit which displays images of the program, the tuner unit and the monitor unit being separated from each other, the tuner unit being configured to transmit the program data to the monitor unit via wireless transmission;
    wherein the tuner unit comprises:
        a recorder/player which records the received program to a recording medium and plays it back therefrom;
        a wireless transmitter which is configured to transmit data of the received program or the program played back by the recorder/player to the monitor unit via wireless transmission, using either one of a first channel sharing with a commercial radar wave or a second channel not sharing with the commercial radar wave;
        a wireless receiver which searches for an unused channel from the first channel and the second channel for wireless transmission of the program data and detects the arrival of the commercial radar wave; and
        a controller which controls the recorder/player and controls the wireless transmitter in order to transmit the program data using either one of the first channel or the second channel searched for as the unused channel by the wireless receiver;
    wherein when the wireless receiver detects the arrival of the commercial radar wave while the wireless transmitter performs the wireless transmission of the program data using the first channel, the controller controls the wireless transmitter to stop the wireless transmission of the program data and to resume the wireless transmission by changing the channel from the first channel to the second channel, and
    wherein, after the resumption of the wireless transmission, the controller controls the recorder/player in order to play back on a time-shift basis the program recorded on the recording medium from the position where the wireless transmission is stopped and controls the wireless transmitter in order to perform the wireless transmission of the program data which is played back using the changed second channel.

2. The television receiver according to claim 1,
    wherein, when the start time of the wireless transmission of the received program is late for the program start time because of the processing by the wireless receiver to search for the unused channel, the controller controls the recorder/player in order to play back on a time-shift basis the program recorded on the recording medium, and controls the wireless transmitter in order to transmit the program data played back to the monitor unit via wireless transmission.

3. The television receiver according to claim 1,
    wherein, when the wireless receiver detects the arrival of a commercial radar wave while the wireless transmitter transmits the program data using the first channel, the controller controls the wireless receiver so as to search for an unused channel again,
    in case the second channel is detected as the unused channel as the result of the search, the controller controls the wireless transmitter in order to change the channel from the first channel to the second channel.

4. The television receiver according to claim 1, wherein the wireless transmitter performs wireless transmission by using one of a plurality of bands having different priorities including the first and second channels; and
    wherein the wireless receiver searches for an unused channel in the bands in order of their priorities to set a detected channel for wireless transmission and, when a channel in a band having lower priority is selected, searches for an unused channel in a band having higher priority while performing wireless transmission to set a detected channel.

5. The television receiver according to claim 2,
    wherein the monitor unit includes a warning display data generator which generates a warning message notifying that program viewing will be delayed or interrupted because of channel setup for wireless transmission; and
    wherein, when wireless transmission of program data from the wireless transmitter to the monitor unit is not possible, the monitor unit displays the warning message generated by the warning display data generator.

6. The television receiver according to claim 3,
    wherein, when wireless transmission of program data from the wireless transmitter to the monitor unit is interrupted, the monitor unit displays a still picture displayed immediately before transmission is interrupted.

7. The television receiver according to claim 1,
    wherein each of the tuner unit and the monitor unit includes a remote control signal receiver for receiving an operation signal from a remote control;
    wherein, when wireless transmission between the tuner unit and the monitor unit is possible, the remote control signal receiver of the monitor unit receives the operation signal from the remote control and then transmits it to the tuner unit; and wherein, when wireless transmission between the tuner unit and the monitor unit is not possible, the remote control signal receiver of the tuner unit receives the operation signal from the remote control.

8. A television receiver comprising:

a tuner unit which receives program data; and a monitor unit which displays images of the program, the tuner unit and the monitor unit being separated from each other, the tuner unit being configured to transmit the program data to the monitor unit via wireless transmission;

wherein the tuner unit comprises:

a recorder/player which records the received program to a recording medium and plays it back therefrom;

a wireless transmitter which is configured to transmit data of the received program or the program played back by the recorder/player to the monitor unit via wireless transmission, using either one of a first channel sharing with a commercial radar wave or a second channel not sharing with the commercial radar wave;

a wireless receiver which searches for an unused channel from the first channel, and the second channel for wireless transmission of the program data and detects the arrival of the commercial radar wave; and a controller which controls the recorder/player and controls the wireless transmitter in order to transmit the program data using either one of the first channel or the second channel searched for as the unused channel by the wireless receiver;

wherein when the wireless receiver detects the arrival of the commercial radar wave while the wireless transmitter performs the wireless transmission of the program data using the first channel, the controller controls the wireless transmitter to stop the wireless transmission of the program data and to resume the wireless by using the second channel instead of the first channel if the second channel includes an unused channel, and wherein, the controller controls the recorder/player in order to play back on a time-shift basis the program recorded on the recording medium from the position where the wireless transmission is stopped and controls the wireless transmitter in order to perform the wireless transmission of the program data which is played back on a time-shift basis using the changed second channel.

9. The television receiver according to claim 1, wherein, the second channel includes a channel having higher data transmission rate and a channel having lower data transmission rate, and the channel having higher data transmission rate is selected at high priority when the first channel is changed to the second channel.

10. The television receiver according to claim 8, wherein, the second channel includes a channel having higher data transmission rate and a channel having lower data transmission rate, and the channel having higher data transmission rate is selected at high priority when the first channel is changed to the second channel.

* * * * *